United States Patent

Martin et al.

[11] Patent Number: 5,374,214
[45] Date of Patent: Dec. 20, 1994

[54] BREAST PROCESSOR

[75] Inventors: Eugene Martin, Denver; Scott Cook, Strasburg, both of Pa.

[73] Assignee: Foodcraft Equipment Company, Lancaster, Pa.

[21] Appl. No.: 98,007

[22] Filed: Jul. 29, 1993

[51] Int. Cl.⁵ .............................................. A22C 21/00
[52] U.S. Cl. ................................. 452/165; 452/166; 452/170; 452/160
[58] Field of Search ............... 452/165, 166, 170, 160, 452/136, 147, 154, 155, 182, 183

[56] References Cited

U.S. PATENT DOCUMENTS

| | | | |
|---|---|---|---|
| 4,178,659 | 12/1979 | Simonds | 452/182 |
| 4,424,608 | 1/1984 | Martin | 452/165 |
| 4,477,942 | 10/1984 | Martin et al. | 452/136 |
| 4,562,613 | 1/1986 | Lewis | 452/160 |
| 4,564,976 | 1/1986 | Beech et al. | 452/160 |
| 4,682,386 | 7/1987 | Hazenbroek et al. | 452/165 |
| 4,780,930 | 11/1988 | Sparkia | 452/165 |
| 4,937,918 | 7/1990 | Martin | 452/136 |
| 5,083,974 | 1/1992 | Martin et al. | 452/169 |
| 5,194,035 | 3/1993 | Dillard | 452/165 |

*Primary Examiner*—Willis Little
*Attorney, Agent, or Firm*—Shoemaker and Mattare, Ltd.

[57] ABSTRACT

A chicken breast processor has an endless conveyor on which are mounted a series of special fixtures for supporting a bird carcass during automatic butchering. Each fixture has a pair of spaced bars bearing respective upper and lower arms. Each of the arms has a beveled upper surface, so that an open "V" is formed for supporting both the backbone from within the carcass, and the breasts from below, to better locate the carcass for precise cutting. Carcasses are transferred from a tined disk onto the fixtures as the fixtures are rotated toward the disk to compensate for speed differential between it and the conveyor. A variety of cuts can be obtained from the device.

13 Claims, 6 Drawing Sheets

BREAST PROCESSOR

BACKGROUND OF THE INVENTION

This invention relates generally to butchering equipment, and more particularly to a breast processor for poultry.

Butchering chicken is becoming increasingly automated. A number of inventors have tackled the difficult task of automatically butchering the "upper half" of a chicken carcass, i.e., the back, breasts and wings. However, owing in part to the fact that chickens are not exactly uniform workpieces, either in size or proportion, this task has continued to require human intervention at certain critical points, to avoid unsatisfactory cutting that would reduce yields and/or produce an inferior product. It is desired to minimize the need for human intervention, both to protect workers from cutting blades and to improve butchering efficiency.

SUMMARY OF THE INVENTION

An object of the invention is to transfer, automatically, bird carcasses from a tined disk to a fixture for supporting the carcass as it is cut up.

Another object of the invention is to accurately support carcasses, regardless of size variations, for precise automatic cutting.

A further object is to provide a versatile machine capable of cutting poultry breasts in different ways.

These and other objects are attained by a breast processor having an endless conveyor on which are mounted a series of special fixtures for supporting a bird carcass during automatic butchering. Each fixture has a pair of spaced bars bearing respective upper and lower arms each having beveled upper surfaces, so that an open "V" is formed for supporting both the backbone from within the carcass, and the breasts from below. These vees provide a natural center plane toward which the carcass gravitates, enabling precise cutting. Carcasses are transferred from a tined disk onto the fixtures as the fixtures are rotated toward the disk to compensate for speed differential between it and the conveyor. A wide variety of cuts can be obtained from the device.

BRIEF DESCRIPTION OF THE DRAWINGS

In the accompanying drawings.

DESCRIPTION OF THE PREFERRED EMBODIMENT

Figure 1:
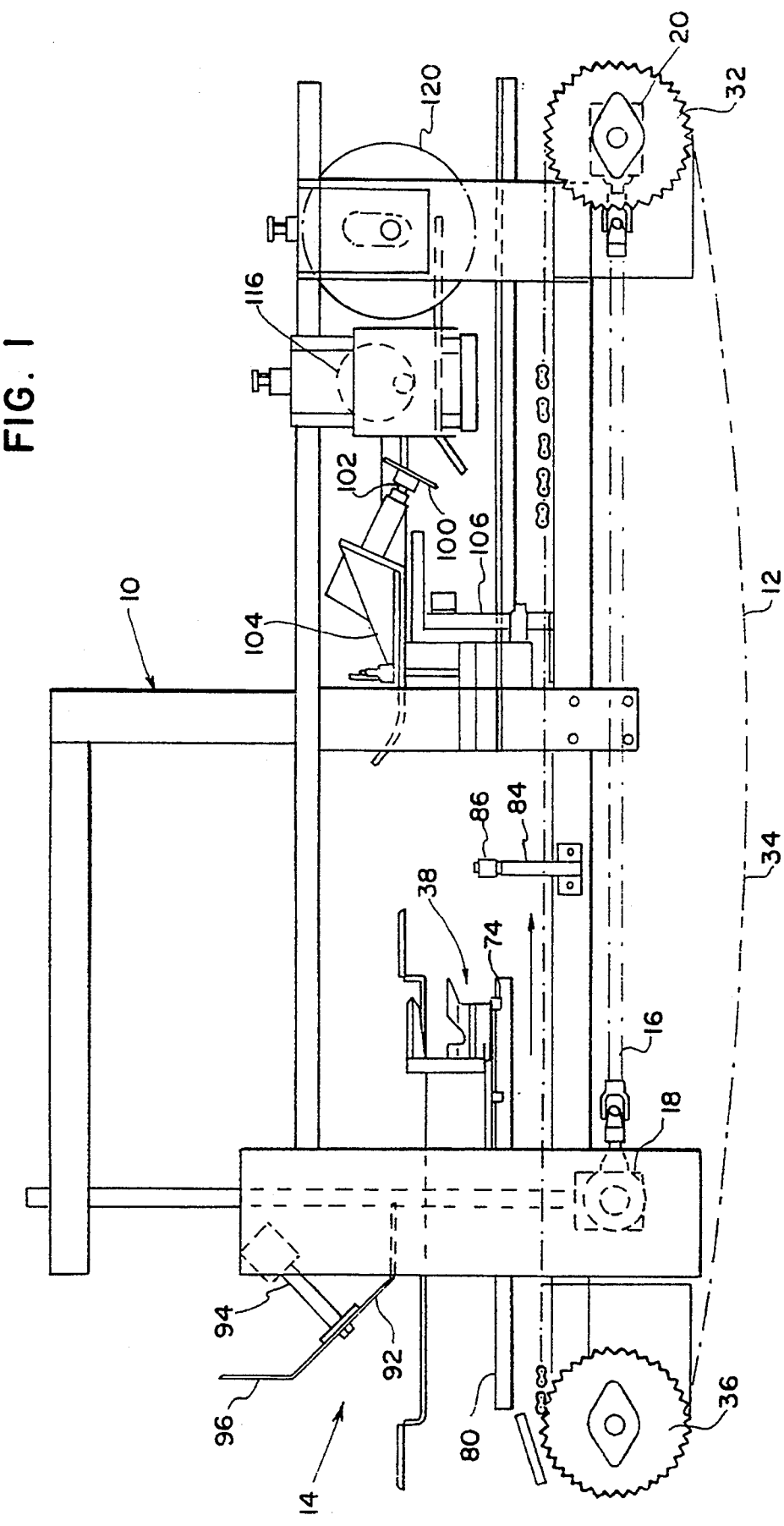
FIG. 1 is a diagrammatic side elevation of a breast processor embodying the invention.

A breast processor embodying the invention includes a frame, designated generally by numeral 10 in FIG. 1, which supports an endless conveyor 12 whose upper ran moves in a "downstream" direction indicated by an arrow. The conveyor receives poultry carcasses from a transfer device 14, appearing to the left in FIG. 1, and moves them through a series of cutting implements appearing to the right.

Figure 3:
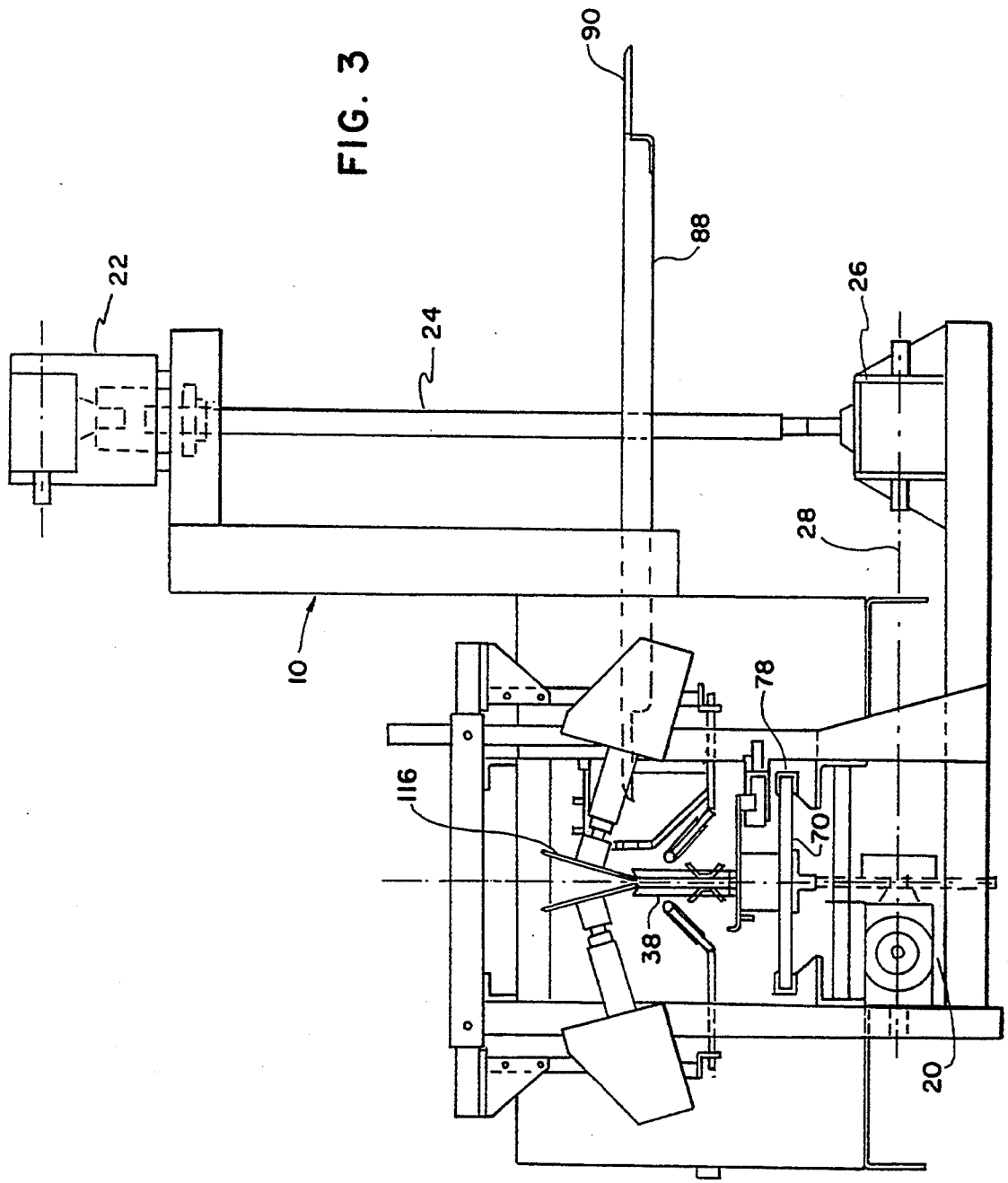
FIG. 3 is an end view thereof, seen from the downstream end of the apparatus.

The conveyor is driven, via a drive shaft 16 and right-angle transfer units 18,20 from a source of power, which may be either a motor, or preferably, a power take-off unit driven by the chain of a foot shackle conveyor (not shown) that carries birds through the processing plant. The power unit 22 seen at the top of FIG. 3 is therefore illustrated diagrammatically. Items 24,26,28 are, respectively, a vertical drive shaft, a right-angle transfer unit, and a horizontal drive shaft connecting unit 26 to unit 18.

Unit 20 drives a downstream sprocket 32. The conveyor chain 34 runs in an endless loop around this end an upstream idler sprocket 36, carrying a series of fixtures 38 through the cutting stations. The fixtures are affixed to the chain at about one foot intervals, but for clarity, only one such fixture is shown in each of FIGS. 1, 2 and 3.

Figure 4:
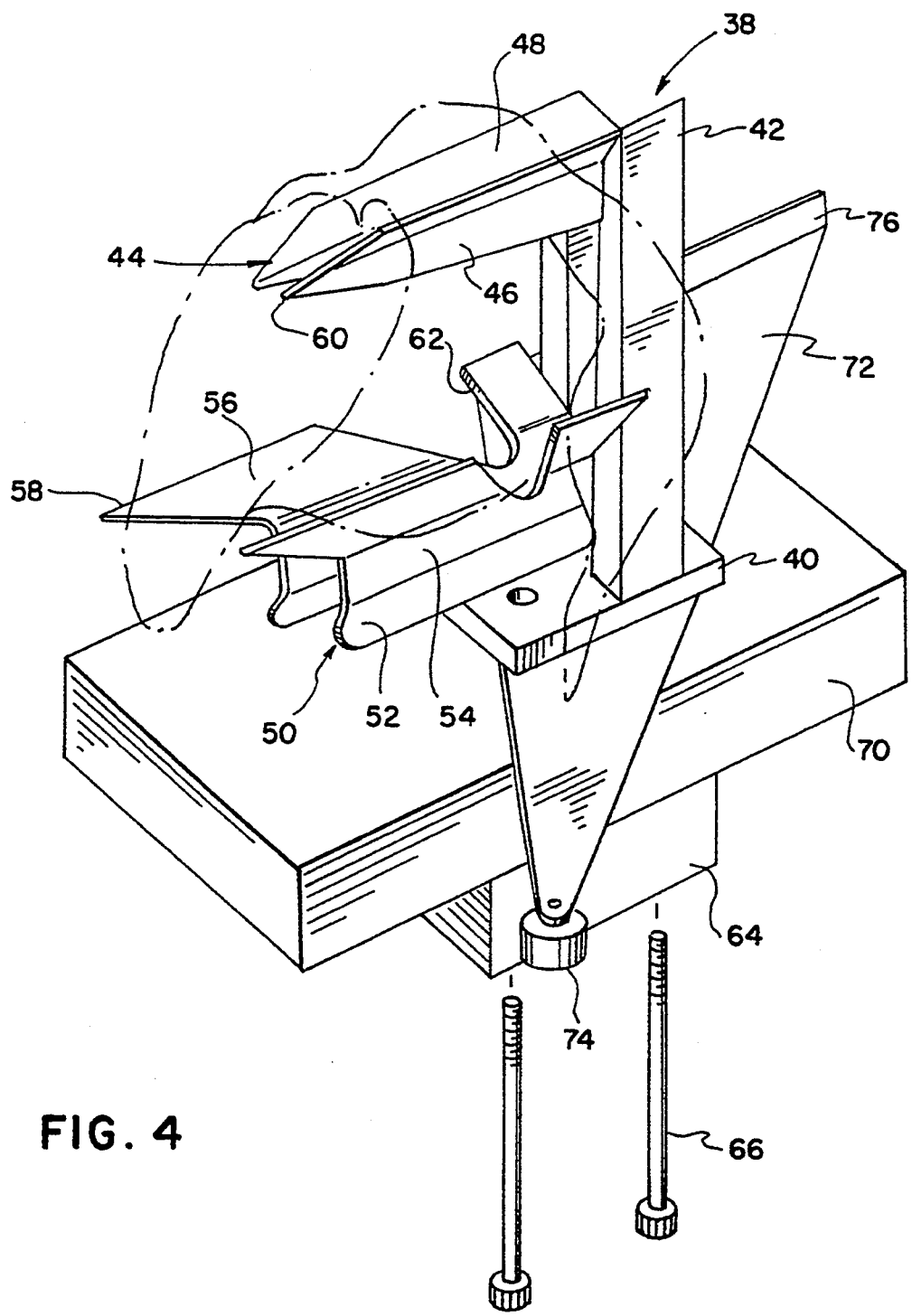
FIG. 4 is a perspective view of a portion of the invention.

FIG. 4 shows a fixture 38 in detail. It includes a base plate 40 to which are welded two spaced vertical bars 42, each of which is inwardly beveled at a 45° angle at the top. The gap (visible in FIG. 3) between the bars 42, about ⅜ of an inch, provides clearance for a vertical blade described below.

A pair of upper arms 44, having a similar spacing are welded to the upper ends of the bars, and normally face downstream. Each upper arm is bent lengthwise, so that it has an lower portion 46 in a vertical plane, and an upper portion 48 flared outward about 45°, so that the upper surface of the upper portion is continuous with the beveled upper end of the bar to which it is affixed.

The upper bars overlie a pair of lower arms 50, each of which has a vertical center portion 52, a lower flange 54 which flares outward from the center portion, and an upper flange 56 which flares outward and upward from the center portion, at about 45° from vertical. Each upper flange has a protruding triangular tip 58 that extends beyond the tip 60 of the corresponding upper arm. A notch 62 in each lower arm provides clearance for a blade described subsequently.

An important feature of the invention is the way in which the fixtures are attached to the conveyor: they can rotate through at least 90° about a vertical axis. As FIG. 4 shows, the base of the fixture is affixed to a UHMW (ultra-high molecular weight) polyethylene retainer block 64 by countersunk screws 66 both of which extend through a large hole 68 (not shown) in a guide block 70, and through bolt holes (not shown) in a triangular follower plate 72. The follower plate has a cylindrical UHMW cam follower 74 affixed to it at one apex, and one edge adjacent another apex on the opposite side of the fixture has an upwardly extending flange 76. The fixture, follower plate, and retainer block, interconnected by the screws, are free to rotate about a vertical axis, with respect to the guide block, which is affixed to the conveyor chain, and is prevented from rotating, at least along most of the upper run of the chain, by fixed guide rails 78 best seen in FIG. 3.

Figure 2:
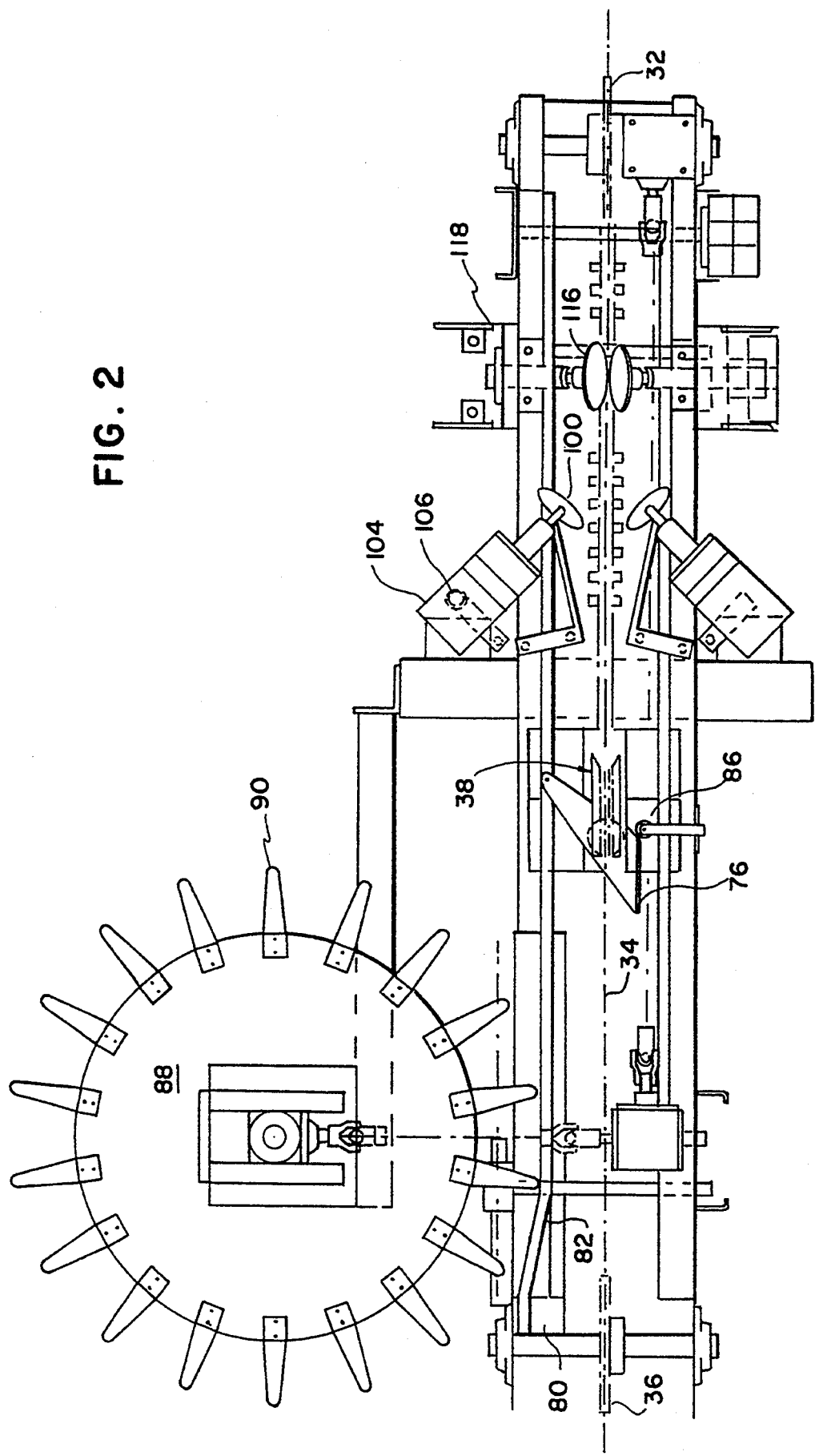
FIG. 2 is a top plan view thereof.

FIG. 2 shows a stationary cam plate 80, which is affixed to the machine frame, on one side of the conveyor, in the path of the bottom 74 of each fixture. The cam plate has an upwardly open curvilinear groove 82 slightly wider and deeper than the button. Interaction between these parts rotates the fixture, as will be described.

A post 84, supporting a roller 86 at its upper end, is also affixed to the frame, but on the side opposite the cam plate. The roller is positioned so as to strike the flange 76 of each fixture, which has been rotated out of its normal position by the cam plate. Thus, as each fixture is carried along by the chain, the cam plate 80 rotates the fixture one way, and the roller 86 subsequently rotates it back to its normal orientation, as suggested by broken lines in FIG. 5.

Now, adjacent the conveyor, on the side of the cam plate 80, there is a large transfer disk 88 supported by the vertical drive shaft 24. This disk thus rotates synchronously with the conveyor chain, but its peripheral speed is somewhat slower. Radially extending, round-tipped tapered tines 90, each about eight inches long and having edges bent upward, are affixed to the disk at equal intervals, e.g., every 20°.

Figure 5:
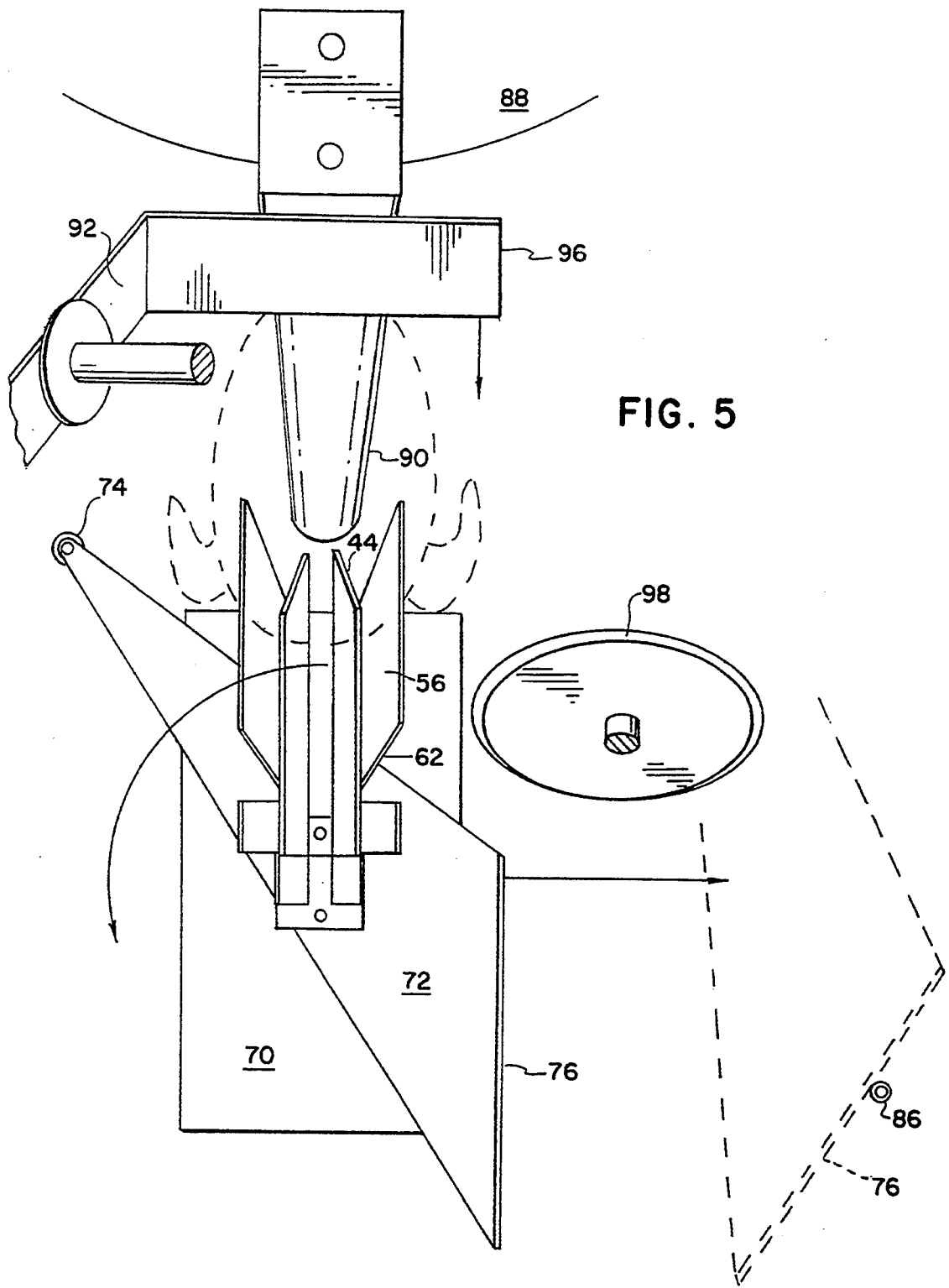
FIG. 5 is a view, at an enlarged scale, of a portion of FIG. 2, showing also an optional cutting blade.

The cam plate rotates each fixture toward the disk 88, in the direction suggested by the curved arrow in FIG. 5, so that it arms 44 face and are aligned with the tines at the point of closest approach. Considering that the conveyor speed is higher (about 50%) faster) than the peripheral speed of the tines, it is necessary compensate for the speed differential, to provide a sufficiently long dwell period for carcasses to be transferred from the tines, onto which they have been placed, to the fixture arms. This compensation is accomplished by designing the contour of the cam slots so that the fixture is rotated rearward, as the fixture approaches the tine, at such a speed that the tips of the arms have an absolute speed about equal to that of the tine tips. The exact contour of the cam slot, then, will depend upon factors including the relative speeds of the disk and the conveyor.

To push the carcasses from the tines onto the fixtures, there is a rotary paddle 92 supported on a synchronously powered shaft 94 having a 45° axis, about the disk 88. The paddle has two arms, the tips 96 of which are bent upward 45°, so that the lower tip sweeps through a position in which it is horizontal and just above the tines. The direction of rotation is such that a paddle tip sweeps each carcass from its tine (onto which is was previously loaded by means not shown), onto the upper arms of the fixture. FIG. 4 shows a carcass on the fixture, in phantom lines. One may see that the open "V" between the two upper arms supports the backbone, while the open "V" between the two lower arms supports the breast from below. Both of these vees tend to center the bird, top and bottom, so that subsequent cutting is more precise.

Certain cutting schemes (e.g., the so-called "9 piece" cut) call for removal of the lower portion of the breast, that is, the portion below the hard part of the sternum, before the breast is halved. To make this cut, an optional rotary a blade 98 (FIG. 5) is placed in the path of the breast, just down-stream of the fixture, before it is rotated back to its normal orientation by the troller 86. Now the purpose of the notches 62 is apparent: they provide clearance for the blade as this cut is made.

Figure 6:
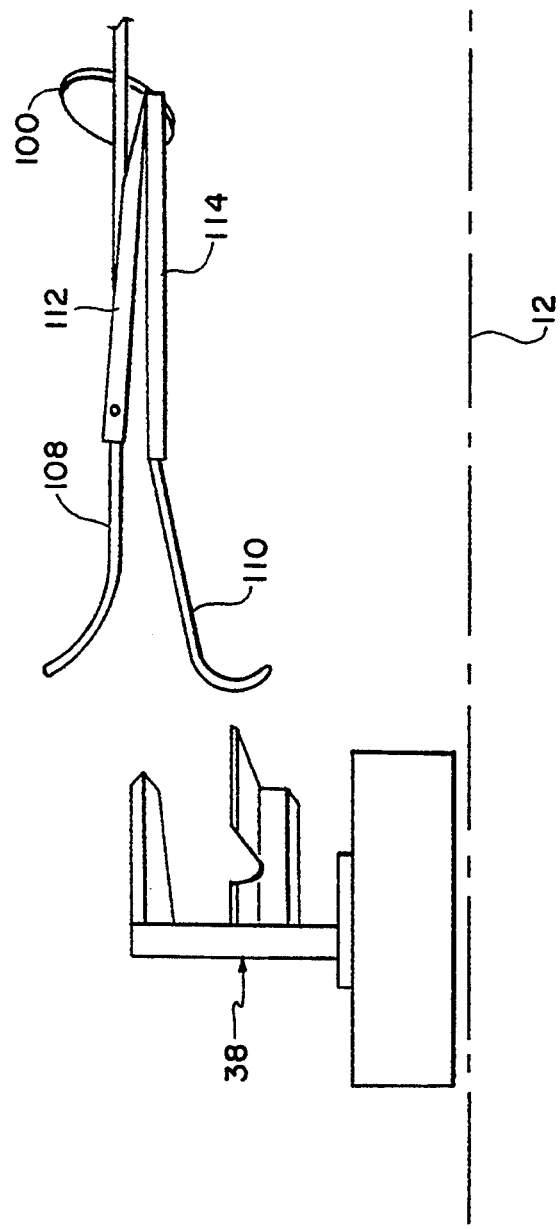
FIG. 6 is a view, at an enlarged scale, of a portion of FIG. 1.

Now with reference to FIG. 2, we turn to the downstream portion of the apparatus, which includes five rotary blades. The first pair of blades are wing cutters 100, supported on motor-driven shafts 102. In the configuration shown in FIG. 2, these blades sever the wing from the breast at the shoulder joint. However, the blades may be swung out of position to make a cut leaving the wing on the breast. To make this possible, each wing cutter is supported on a platform 104 mounted on a vertical shaft 106 about which it can pivot at least 60°, to a position where the blades are completely clear of the product. As can be seen in FIG. 6, there are upper and lower guide rails 108.110 which pass over and under the shoulder, to locate it, and then a pair of bars 112,114, the lower of which is spring biased toward the other, so that the shoulder is precisely positioned before the cutting blade is encountered.

Just downstream of the wing cutter, there are a pair of backbone cutting blades 116, whose drive motors are supported on a carriage 118 affixed to the frame by bolts passing through slots which permit one to alter both the height and angle of the blades. Thus, a packer can fine tune the backbone cut, depending on the type of product desired.

Finally, at the end of the apparatus, there is a large single rotary halving blade 120, mounted right on the center plane of the apparatus. This blade can be moved up or down about two inches on the frame. In tis lowermost position, the edge of the blade extends between the fixture bars, almost to the base of the fixture, and severs the breasts from one another. When raised, however, the blade passes between the upper arms of the fixture, but not the lower ones, and so only cuts the back in half, without separating the breasts.

An advantage of the invention is its versatility, in that it gives it operator the opportunity to provide a variety of different cuts with minimal setup time between cuts. Another advantage is that the fixture design so accurately positions the breast for cutting that product quality and yield is improved, and the need for human intervention is minimized.

Since the invention is subject to modifications and variations, it is intended that the foregoing description and the accompanying drawings shall be interpreted as illustrative of only one form of the invention, whose scope is to be measured by the following claims.

I claim:

1. A breast processing machine comprising
   a frame,
   an endless conveyor supported by the frame,
   means for driving the conveyor about an endless path,
   a plurality of carcass supporting fixtures rotatably affixed to the conveyor at intervals, each fixture comprising means for supporting a carcass for butchering, with its backbone substantially horizontal,
   a transfer disk, rotatable on a vertical axis, to one side of the conveyor,
   a plurality of elongate members extending radially outward from said disk at intervals along its periphery, said elongate members lying in a plane about level with the carcass supporting means of the fixtures,
   means for turning each said fixture about its axis, as it approaches said disk, so that its supporting means point toward said disk,
   means for rotating said disk in synchronization with said conveyor, so that its elongate members align with the supporting means of a respective fixture in a transfer zone, and
   means for moving a carcass, mounted on one of said elongate members, from said member onto the supporting means of a respective fixture while said elongate member is aligned with the supporting means in the transfer zone.

2. The invention of claim 1, wherein the carcass supporting means on each fixture comprises a pair of upper arms for supporting a carcass from inside beneath the backbone.

3. The invention of claim 2, wherein the conveyor has a plurality of guide blocks affixed thereto, the frame has rails thereon for engaging edges of said blocks, and each said fixture is rotatably affixed to a respective guide block.

4. The invention of claim 2, wherein the turning means comprises a stationary cam affixed to said frame and a follower attached to said fixture.

5. The invention of claim 4, wherein said cam is configured to turn said fixture at a rate such that, within said transfer zone, the tips of the upper arms have substantially the same absolute speed as the tine, to provide a dwell period during which the carcass can be transferred.

6. The invention of claim 4, further comprising means for reorienting said fixture, so that so upper arms are parallel to said path, said reorienting means being downstream of said turning means and said transfer zone.

7. The invention of claim 1, wherein said moving means comprises a rotary paddle having blades whose tip pass over the transfer zone, just about said tines, and means for moving the paddle, in synchronization with the disk, so that it sweeps the carcass mounted on a tine below onto the carcass suggesting means of the fixture opposite.

8. The invention of claim 7, wherein the paddle rotates about an axis substantially inclined to vertical, and the tips are bent with respect to the blades so that each tip is substantially horizontal as it passes just over said tine.

9. The invention of claim 10, further comprising a halving blade for cutting the carcass in a vertical plane containing the backbone, wherein said halving blade is vertically adjustable between a lower position in which it cuts the carcass completely in half, and an upper position in which it cuts only the back of the carcass in half.

10. The invention of claim 1, further comprising a pair of wing cutter blades supported on platforms on vertical pivot axes, so that they can be swung from a first position, in which they are aligned with the shoulder joint on carcasses on the fixtures, to a second position in which they do not contact the carcass.

11. The invention of claim 1, further comprising a pair of backbone cutting blades, one on either side of the center plane of the fixtures, each of said blades having an adjustable support which permits one to vary both the depth and angle of the backbone cut.

12. The invention of claim 1, wherein the carcass is turned by said cam to a transfer orientation in which the backbone is perpendicular to its direction of movement, and further comprising a cross-breast cutting blade for severing a lower portion of the breast while the carcass is in said perpendicular orientation.

13. The invention of claim 12, wherein said fixture has a pair of lower arms for supporting the breasts from below, and said arms have notches through which said cross-breast cutting blade passes.

* * * * *